April 14, 1953  A. FERMANIAN ET AL  2,634,696
UNLOADING APPARATUS

Filed Oct. 20, 1948  3 Sheets-Sheet 1

INVENTORS
A. FERMANIAN
A. P. JURNAK
BY
ATTORNEY

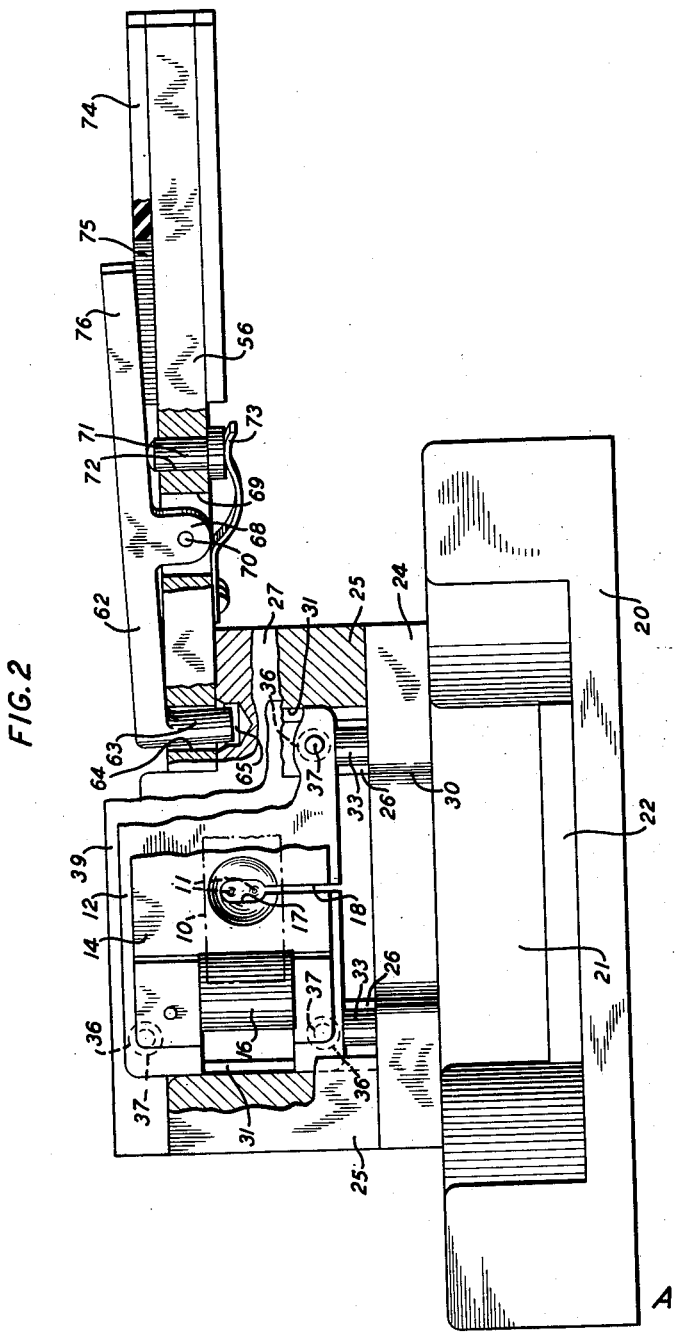

April 14, 1953   A. FERMANIAN ET AL   2,634,696
UNLOADING APPARATUS
Filed Oct. 20, 1948   3 Sheets-Sheet 3
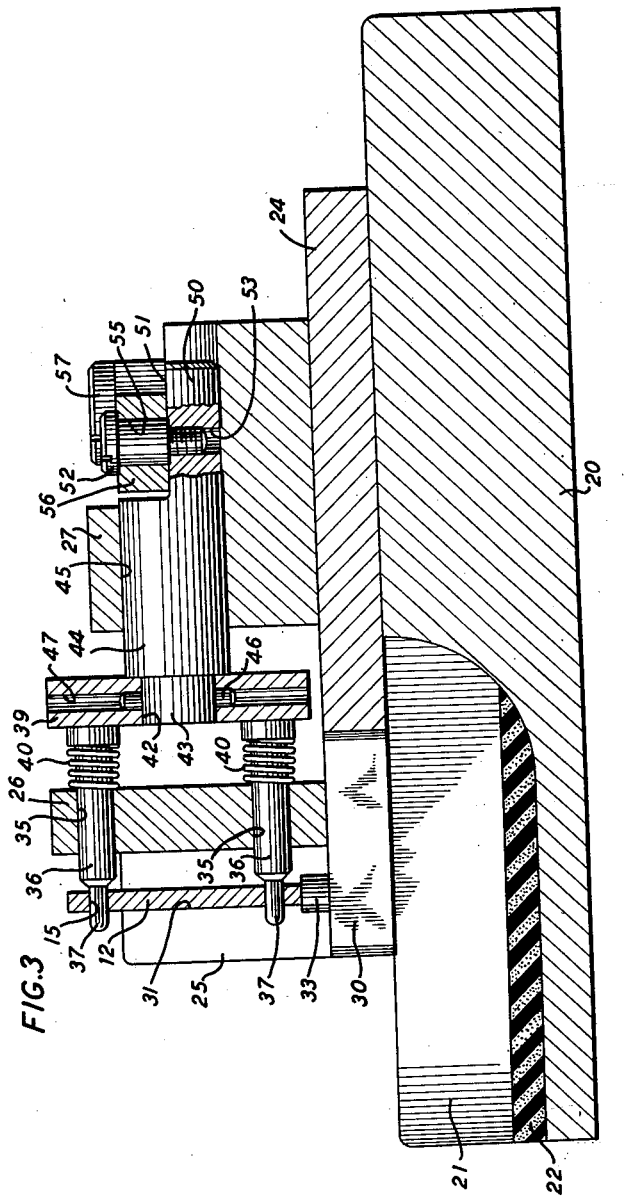
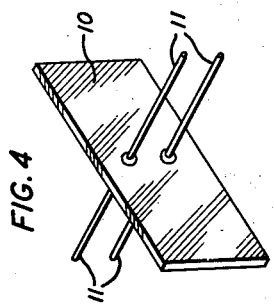
INVENTORS
A. FERMANIAN
A. P. JURNAK
BY *W. E. Parnell*
ATTORNEY Patented Apr. 14, 1953

2,634,696

UNITED STATES PATENT OFFICE 2,634,696

UNLOADING APPARATUS

Armen Fermanian, Rutherford, and Andrew P. Jurnak, Elizabeth, N. J., assignors to Western Electric Company, Incorporated, New York, N. Y., a corporation of New York Application October 20, 1948, Serial No. 55,562

1 Claim. (Cl. 113—99)

This invention relates to unloading apparatus, and more particularly to apparatus for receiving and opening article holders for unloading the articles therefrom.

Due to the scarcity of quartz suitable for use in the communication arts, a synthetic crystal commercially known as EDT crystal, grown in a solution of ethylene diamine tartrate has been adopted for use in certain electrical units as a suitable substitute. The selection of synthetic crystals for use in place of quartz necessitated new developments in machines and methods of processing the synthetic crystals as the machines previously employed for processing quartz crystals could not be utilized for this purpose. The process of attaching lead wires to synthetic crystal plates is the principal divergence in their manufacture from that of quartz crystal plates. To carry out the process of attaching lead wires to the synthetic crystal plates, these plates, initially received at room temperature, must be heated to a higher temperature enabling them to withstand the heat required for soldering the lead wires, the plates being subsequently cooled to room temperature to protect the plates from thermal shock. A holder for each synthetic crystal plate to protect it against mechanical abuse and from thermal shock is disclosed in the copending application of G. W. Soderman, Serial No. 55,577, filed October 20, 1948. An apparatus for loading the synthetic crystal plate in the holder whereby the lead wires may be accurately soldered to their predetermined positions on the plate is disclosed in the copending application of G. W. Soderman, Serial No. 55,578, filed October 20, 1948, now Patent No. 2,514,099. There remains the problem of unloading the completed crystal plates with their soldered leads from the holders.

An object of the invention is to provide an unloading apparatus which may readily receive holders for articles and which is efficient in operation to separate the members of the holder to free the article therefrom.

With this and other objects in view, the invention comprises an unloading apparatus having spaced elements to receive and hold one of two companion members of an article holder, which are normally urged toward each other to hold an article therebetween, and spaced members movable relative to the holder to engage the other member thereof to move it relative to the held member to free the article from between the members.

More specifically, the unloading apparatus includes spaced elements with aligned vertical grooves therein to receive the ends of the main member of the holder which has spaced apertures therein adjacent the corners of the companion member of the holder to receive the reduced ends of ejecting pins. The ejecting pins are slidable in apertures of vertical members and have their adjacent ends fixed to a carriage. Springs are interposed between the vertical members and the carriage concentric with each of the ejecting pins to normally urge the carriage and the pins into their normal positions. The carriage includes a portion movable laterally in the aperture of a guide and is connected for actuation to a hand lever normally urged into its unoperated position by a spring and held in that position by a latch which may be released when it is desirable to operate the slide and the ejecting pins through actuation of the lever.

Other objects and advantages will be apparent from the following detailed description when considered in conjunction with the accompanying drawings, wherein Fig. 1 is a fragmentary top plan view of the unloading apparatus, portions thereof being shown in section;

Fig. 2 is a front elevational view of the unloading apparatus, portions thereof being broken away;

Fig. 3 is a vertical sectional view taken substantially along the line 3—3 of Fig. 1; and Fig. 4 is an isometric view of an article, such as a synthetic crystal with lead wires soldered thereto, with which the holder in Fig. 2 is loaded.

Figure 1:
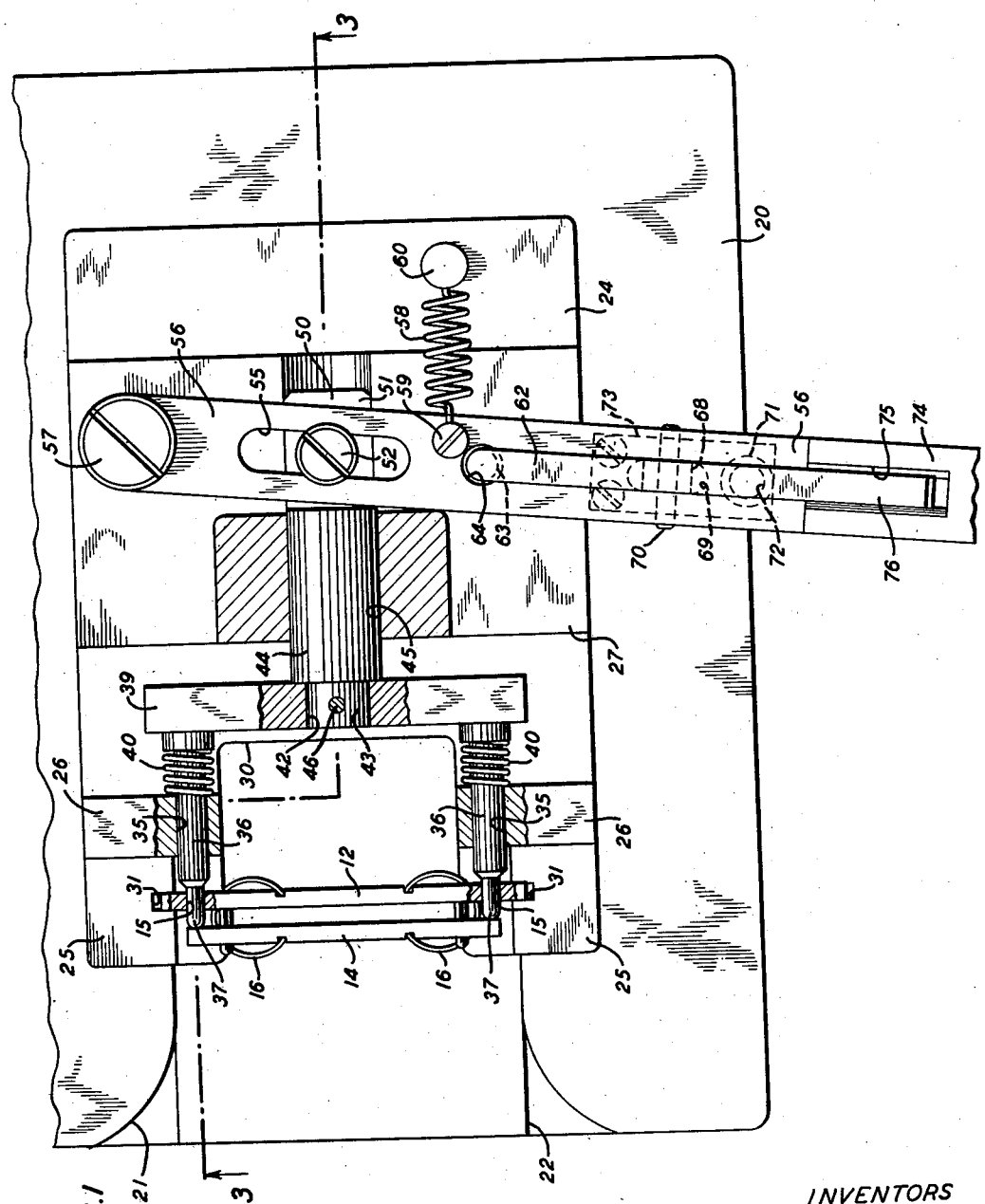

Referring now to the drawings, attention is first directed to Fig. 4 which illustrates the article, namely a synthetic crystal plate 10 having pairs of lead wires 11 soldered to opposing surfaces of the plate. The holder, which is to be unloaded of the article 10 by the apparatus, includes a main member 12 and a companion member 14, the main member being of greater width and length than the companion member and provided with apertures 15 which are disposed adjacent the corners of the companion member 14. The ends of the members 12 and 14 are recessed to receive split cylindrical springs 16 which normally urge the members 12 and 14 of the holder toward each other to hold the article 10 in place, centrally with respect to apertures 17 in both members through which the lead wires 11 are positioned during a previous soldering operation. Furthermore, aligned slots 18 in both members 12 and 14 permit the lead wires 11 to pass therethrough when the article 10 is freed from the members 12 and 14.

The apparatus for unloading the holder comprises a base 20 with a cutaway portion 21 which may be termed "a receiving pocket" for the unloaded articles 10. A pad or cushion 22, upon which the article may fall, is mounted on the bottom of the pocket 21 to eliminate damage to the articles. A main frame 24 of the apparatus is mounted on the base and includes vertically extending holding elements 25, vertical members 26 and an apertured support 27. The elements 25 are mounted upon each side of a cutaway portion 30 in the main frame 24 and have vertical grooves 31 therein to receive the ends of the main member 12 of the holder. Supporting pins 33 are mounted upon the main frame 24 in general alignment with the grooves 31 to support the main member 12 of the holder when disposed in the grooves 31.

The vertical members 26, mounted on each side of the cutaway portion 30, have apertures 35 therein to slidably support ejecting pins 36. The outer ends 37 of the ejecting pins are reduced whereby they may be moved through the apertures 15 of the main member of the holder and engage the corners of the companion member 14 as illustrated in Fig. 1. The opposite ends of the ejecting members 36 are secured to a carriage 39 which is normally urged to the right to move the ejecting pins into their normal positions by the aid of springs 40 disposed concentric with the ejecting pins between their respective vertical members 26 and the carriage 39.

The portion of the carriage identified by reference numeral 39 is in the form of a plate centrally apertured at 42 to receive a reduced end 43 of a reciprocable member 44 which is positioned to slide in a given path in an aperture 45 of the support 27. A pin 46 extending through the reduced portion 43 and having its ends disposed in an aligned aperture 47 of the carriage member 39 connects the two main members 39 and 44 of the carriage into a unit. The member 44 of the carriage has a cutaway portion providing an end portion 50 with a flat upper surface 51. A pivot screw 52 is mounted in a threaded aperture 53 of the portion 50 and extends through an elongate aperture 55 in a hand lever 56.

The hand lever 56 is pivotally mounted at 57 and is normally urged about this pivot by a spring 58 having one end connected at 59 to the lever, the other end connected at 60 to the main frame 24. A latch 62 has an end portion 63 of sufficient length to project through an aperture 64 in the lever 56 and to enter an aperture 65 in the supporting member 27, to lock the lever against movement in its normal position. A central flange 68 integral with the latch 62 extends into an aperture 69 of the lever 56 where it receives a pin 70, carried by the lever, which pivotally supports the latch. A plunger 71 movably disposed in an aperture 72 of the lever 56 is normally urged upwardly by a spring 73 having one end fixedly mounted on the under surface of the lever to normally urged the latch into its engaging position to force its end 63 into the aperture 65 when moved into registration therewith. The lever 56 has a cover 74 on the outer end thereof to provide a hand grip therefor, the cover having a cutaway portion 75 adjacent the free end of the latch 62 whereby the operator, in gripping the handle of the lever, may also grip the handle 76 of the latch, forcing it into its open position.

Considering now the operation of the apparatus, let it be assumed that the lever 56 is in its normal position, latched against movement. A holder containing an article 10 may be inserted in the apparatus with the ends of the main member 12 of the holder entering the vertical grooves 31 of the holding elements 25 while the member 12 rests upon the supporting pins 33. The apparatus may now be operated to open the holder and free the article 10 whereby it may drop on to the cushion 22. To operate the apparatus, the handle 74 of the lever 56 is gripped by the operator, gripping at the same time the handle 76 of the latch 62, depressing the plunger 71 against the force of the spring 73 to move the end portion 63 free of the aperture 65, after which the lever may be moved about its pivot 57, moving the carriage against the forces of the springs 40, until the reduced portions 37 of the ejecting pins 36 enter the apertures 15 of the member 12 and force the member 14 of the holder outwardly into the position shown in Fig. 1. The article 10 which has been gripped between the members 12 and 14 of the holder is free to drop downwardly, the lead wires 11 of the article passing from the apertures 17 through the slots 18 free of the holder and on to the cushion 22 in the pocket 21. The articles 10 are removed from the pocket and placed carefully in suitable containers.

Although the description of the operation may appear lengthy, the actual time required for unloading each article holder is extremely short. Furthermore, the apparatus will automatically reset itself, the springs 40 surrounding the ejecting pins 36 normally urging the member 39 of the carriage to the right (Fig. 1) until it strikes the support 27, while at the same time the spring 58 urges the lever 56 counterclockwise to its normal position and the spring 73 is free after the operator releases the lever and the latch to apply its force to the latch to move it into locking position shown in Fig. 2 when the lever has returned to its normal position. The empty holder may then be removed from the apparatus, after which another holder with an article 10 therein may be readily inserted in place and the unloading operation repeated.

It is to be understood that the above described arrangements are simply illustrative of the application of the principles of the invention. Numerous other arrangements may be readily devised by those skilled in the art which will embody the principles of the invention and fall within the spirit and scope thereof.

What s claimed is:

An apparatus for successively unloading like portable article holders each having companion members normally urged toward each other by springs to hold an article therebetween, one of the members being wider than the other and having spaced apertures, the apparatus comprising a base having an article receiving pocket, a cushion disposed on the floor of the pocket, a main frame mounted on the base, extending over the pocket and having an open portion aligned with the pocket, spaced retaining members mounted on the frame adjacent the open portion and having vertical slots to receive the ends of the apertured member of the holder to hold it against movement over the open portion and the pocket leaving the other member free for movement, supports for the apertured member of the holder mounted on the frame adjacent opposing sides of the open portion, spaced pins, means to support the pins for reciprocable movement in paths aligned with their respective apertures of the article holders when disposed in the apparatus, a carriage to support the pins, means urging the carriage into its normal position and the pins free of the apertures of the holder, and means to move the carriage to cause the pins to enter their apertures of the apertured member simultaneously and move the free member away from the apertured member to free the article to drop through the open portion onto the cushion in the pocket.

ARMEN FERMANIAN
ANDREW P. JURNAK.

References Cited in the file of this patent

UNITED STATES PATENTS

| Number | Name | Date |
| --- | --- | --- |
| 292,599 | Tasker | Jan. 29, 1884 |
| 605,855 | Colborne | June 21, 1898 |
| 1,518,709 | Thomas | Dec. 9, 1924 |
| 1,895,401 | Simonsen | Jan. 24, 1933 |
| 2,434,744 | Moss | Jan. 20, 1948 |
| 2,514,099 | Soderman | July 4, 1950 |